US012586466B2

(12) United States Patent
Mimura

(10) Patent No.: US 12,586,466 B2
(45) Date of Patent: Mar. 24, 2026

(54) TRAFFIC SAFETY ASSISTANCE SYSTEM

(71) Applicant: HONDA MOTOR CO., LTD., Tokyo (JP)

(72) Inventor: Yoshitaka Mimura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 157 days.

(21) Appl. No.: 18/587,374

(22) Filed: Feb. 26, 2024

(65) Prior Publication Data

US 2024/0331538 A1 Oct. 3, 2024

(30) Foreign Application Priority Data

Mar. 31, 2023 (JP) ................................ 2023-057786

(51) Int. Cl.
*G08G 1/0967* (2006.01)

(52) U.S. Cl.
CPC .............................. *G08G 1/096775* (2013.01)

(58) Field of Classification Search
CPC ................................................ G08G 1/096775
USPC .......................................................... 701/117
See application file for complete search history.

(56) References Cited

U.S. PATENT DOCUMENTS 8,031,062 B2 * 10/2011 Smith .................... G08G 1/166 340/936
8,965,670 B2 * 2/2015 Peterson ............ G06Q 30/0261 455/457
9,524,643 B2 * 12/2016 Goerick ................. G06V 20/58
9,547,989 B2 * 1/2017 Fairfield .............. G08G 1/0112
9,679,487 B1 * 6/2017 Hayward ............. G08G 1/0965
9,725,037 B2 * 8/2017 Goudy .................... G08G 1/163
9,922,565 B2 * 3/2018 Thomas ................. G08G 1/163
9,978,273 B2 * 5/2018 Heckmann ............ B60W 50/14
10,755,574 B2 * 8/2020 Park ........................ H04W 4/46
(Continued)

FOREIGN PATENT DOCUMENTS

JP 2012164327 A 8/2012
JP 2015075889 A 4/2015
(Continued)

OTHER PUBLICATIONS

Notice of Reasons for Refusal for Japanese Patent Application No. 2023-057786 dated Nov. 26, 2024; 8 pp.

*Primary Examiner* — Luis A Martinez Borrero
(74) *Attorney, Agent, or Firm* — Armstrong Teasdale LLP

(57) ABSTRACT

A traffic safety assistance system includes an acquiring device configured to acquire information about a plurality of traffic participants, a server device configured to estimate prospective behavior of the plurality of traffic participants, and a notifying device configured to give notifications to the plurality of traffic participants. The plurality of traffic participants includes a first traffic participant and a second traffic participant. The server device is configured to transmit an appearance image of the second traffic participant to the first traffic participant. The notifying device includes a display device configured to display a surrounding area image showing a surrounding area of the first traffic participant, and display the appearance image of the second traffic participant, which is transmitted from the server device to the first traffic participant, at a position corresponding to the second traffic participant in the surrounding area image.

9 Claims, 9 Drawing Sheets

(56) References Cited

U.S. PATENT DOCUMENTS 10,972,975 B2* 4/2021 Song .................... G08G 1/005
11,127,295 B2* 9/2021 Radha .................... G06V 20/58
11,214,248 B2 1/2022 Taniguchi et al.
11,403,943 B2* 8/2022 Foley .................... G08G 1/0116
11,679,760 B2* 6/2023 Finelt .................... G06V 20/58 701/23
2008/0167819 A1* 7/2008 Breed .................... G08G 1/161 701/300
2009/0048750 A1* 2/2009 Breed .................... G08G 1/161 701/70
2009/0140887 A1* 6/2009 Breed .................... G01C 21/1656 701/116
2010/0198513 A1* 8/2010 Zeng .................... G01S 13/931 701/300
2010/0214085 A1* 8/2010 Avery .................... G08G 1/161 340/435
2015/0035685 A1* 2/2015 Strickland .............. B60Q 9/008 340/901
2015/0197248 A1* 7/2015 Breed .............. G08G 1/096775 340/905
2015/0356864 A1* 12/2015 Hutchings ............ G08B 25/009 348/148
2016/0150070 A1* 5/2016 Goren ............... H04M 1/72421 455/418
2016/0357187 A1* 12/2016 Ansari .................... G08G 1/165
2017/0018187 A1* 1/2017 Kim .................... G08G 1/005
2017/0213462 A1* 7/2017 Prokhorov ............. G08G 1/166
2017/0268896 A1* 9/2017 Bai .................... G01C 21/3484
2018/0089907 A1 3/2018 Maruoka et al.
2018/0096605 A1* 4/2018 Bai .................... B60Q 9/008
2018/0261095 A1* 9/2018 Qiu .................... G01S 17/86
2020/0074851 A1* 3/2020 Mukai .................. G08G 1/0125
2020/0074861 A1* 3/2020 Park .................... H04W 4/46
2020/0135018 A1* 4/2020 Baik .................... G06V 20/54
2020/0193811 A1* 6/2020 Zagajac .................. H04W 4/46
2020/0294401 A1* 9/2020 Kerecsen ............... G08G 1/205
2020/0320313 A1* 10/2020 Huang ............. G08G 1/096775
2020/0349842 A1* 11/2020 Radha .................... G06V 10/82
2021/0245758 A1* 8/2021 Ahmad .................. G08G 1/167
2022/0324467 A1* 10/2022 Alvarez ........... G08G 1/096725
2023/0091500 A1 3/2023 Itsukaichi et al.
2023/0196908 A1* 6/2023 Beaurepaire ........... G06V 20/58 701/117
2023/0266133 A1* 8/2023 Horiuchi ............ G01C 21/3461 701/423
2024/0020953 A1* 1/2024 Park .................... G06V 20/56
2024/0177491 A1* 5/2024 Ding .................... G01S 7/003
2024/0214786 A1* 6/2024 Sharma Banjade .... H04W 4/40
2024/0280997 A1* 8/2024 Oba .................... G08G 1/20

FOREIGN PATENT DOCUMENTS

JP 2018056794 A 4/2018
JP WO2018207303 A1 11/2019
JP 2021165938 A 10/2021
JP 2022121370 A 8/2022
WO 2021186854 A1 9/2021

* cited by examiner

TRAFFIC SAFETY ASSISTANCE SYSTEM

TECHNICAL FIELD

The present invention relates to a traffic safety assistance system.

BACKGROUND ART

In recent years, there has been an increase in efforts to give consideration to the vulnerable people among the traffic participants and provide them with access to a sustainable transportation system. Toward this end, research and development is attracting attention to further improve traffic safety and convenience through the development of preventive safety technology.

For example, a technique disclosed in JP2021-165938A causes a display device of a first traffic participant (an own vehicle) to display a surrounding area image showing a surrounding area of the first traffic participant, and further display symbolic images indicating second traffic participants (other vehicles) at positions corresponding to the second traffic participants in the surrounding area image.

However, in JP2021-165938A, the second traffic participants are displayed using the same symbolic images (see FIG. 4 of JP2021-165938A). Accordingly, it is difficult to determine which second traffic participant in the actual space corresponds to which symbolic image in the surrounding area image. Further, in a case where there is a second traffic participant hiding in a blind spot in the actual space (for example, a vehicle hiding behind a right-turning vehicle in the oncoming lane), it is difficult to determine a symbolic image in the surrounding area image to which the above-mentioned second traffic participant corresponds.

SUMMARY OF THE INVENTION

In view of the above background, an object of the present invention is to provide a traffic safety assistance system including a display device that enables easy determination of the correspondence and relationship between the second traffic participant in the actual space and the appearance image in the surrounding area image, and contributes to the development of a sustainable transportation system accordingly.

To achieve such an object, one aspect of the present invention provides a traffic safety assistance system (1), comprising: an acquiring device (12 to 15) configured to acquire information about a plurality of traffic participants (2 to 5) that exists in a target traffic area (A); a server device (18) configured to estimate prospective behavior of the plurality of traffic participants based on the information about the plurality of traffic participants acquired by the acquiring device; and a notifying device (12 to 15) configured to give notifications to the plurality of traffic participants based on an estimation result of the server device, wherein the plurality of traffic participants includes at least one first traffic participant (71) and at least one second traffic participant (72 to 74), the server device is configured to transmit an appearance image (92 to 94) of the second traffic participant corresponding to appearance of the second traffic participant to the first traffic participant, the notifying device includes a display device (84) provided in the first traffic participant, and the display device is configured to display a surrounding area image (91) showing a surrounding area of the first traffic participant, and display the appearance image of the second traffic participant, which is transmitted from the server device to the first traffic participant, at a position corresponding to the second traffic participant in the surrounding area image.

According to this aspect, the appearance image corresponding to the appearance of the second traffic participant is displayed at the position corresponding to the second traffic participant in the surrounding area image. Thus, it is possible to bring the appearance image of the second traffic participant in the surrounding area image closer to the actual appearance of the second traffic participant. Accordingly, it is possible to easily determine the correspondence and relationship between the second traffic participant in the actual space and the appearance image in the surrounding area image, and contribute to the development of a sustainable transportation system accordingly.

In the above aspect, preferably, the server device is configured to transmit sound data to the first traffic participant together with the appearance image of the second traffic participant, the sound data being data on a sound generated by the second traffic participant, the notifying device includes a sound output device (85) provided in the first traffic participant, and the sound output device is configured to output a sound corresponding to the sound data while the display device is displaying the appearance image of the second traffic participant.

According to this aspect, the sound output device outputs a sound corresponding to the data on a sound generated by the second traffic participant simultaneously as the display device displays the appearance image corresponding to the appearance of the second traffic participant. Accordingly, it is possible to more easily determine the correspondence and relationship between the second traffic participant in the actual space and the appearance image in the surrounding area image.

In the above aspect, preferably, the display device is configured to display a prescribed symbolic image at the position corresponding to the second traffic participant in the surrounding area image in a case where the server device cannot transmit the appearance image of the second traffic participant to the first traffic participant.

According to this aspect, even if the server device cannot transmit the appearance image of the second traffic participant to the first traffic participant, it is possible to show the position of the second traffic participant in the surrounding area image using the symbolic image.

In the above aspect, preferably, the server device includes a storage unit (61) configured to store appearance images of the plurality of traffic participants, and the server device is configured to transmit the appearance image of the second traffic participant read from the storage unit to the first traffic participant in a case where the storage unit stores the appearance image of the second traffic participant.

According to this aspect, since the server device reads the appearance image of the second traffic participant from its own storage unit, it is possible to promptly transmit the appearance image of the second traffic participant from the server device to the first traffic participant.

In the above aspect, preferably, the server device is configured to transmit the appearance image of the second traffic participant acquired from the second traffic participant to the first traffic participant in a case where the storage unit does not store the appearance image of the second traffic participant but the second traffic participant holds the appearance image of the second traffic participant.

According to this aspect, it is possible to increase the probability that the server device can transmit the appearance image of the second traffic participant to the first traffic participant.

In the above aspect, preferably, the server device is configured to transmit the appearance image of the second traffic participant acquired via an outside network to the first traffic participant in a case where the storage unit does not store the appearance image of the second traffic participant and the second traffic participant does not hold the appearance image of the second traffic participant.

According to this aspect, it is possible to further increase the probability that the server device can transmit the appearance image of the second traffic participant to the first traffic participant.

In the above aspect, preferably, the server device is configured to determine whether a risk is posed between the plurality of traffic participants, the at least one second traffic participant comprises a plurality of second traffic participants including: a plurality of risk parties that is included in parties involved in the risk; and a non-risk party that is not included in the parties involved in the risk, and the display device is configured to display appearance images of the plurality of risk parties, which vary from one risk party to another, at positions corresponding to the plurality of risk parties, and display a prescribed symbolic image at a position corresponding to the non-risk party.

According to this aspect, it is possible to easily distinguish the second traffic participants included in the parties involved in the risk and the second traffic participant not included in the parties involved in the risk.

In the above aspect, preferably, the first traffic participant is a first vehicle, the second traffic participant is a second vehicle, and the display device is configured to blink at least a portion of an appearance image of the second vehicle in a case where a blinker (75) of the second vehicle is operating.

According to this aspect, it is possible to confirm that the second vehicle is about to turn based on the appearance image of the second vehicle.

In the above aspect, preferably, the first traffic participant is a first vehicle, the second traffic participant is a second vehicle, and the server device is configured to transmit a three-dimensional image of the second vehicle corresponding to a vehicle model and color of the second vehicle to the first vehicle.

According to this aspect, it is possible to further bring the appearance image of the second traffic participant in the surrounding area image closer to the actual appearance of the second traffic participant. Accordingly, it is possible to more easily determine the correspondence and relationship between the second traffic participant in the actual space and the appearance image in the surrounding area image.

Thus, according to the above aspects, it is possible to provide a traffic safety assistance system including a display device that enables easy determination of the correspondence and relationship between the second traffic participant in the actual space and the appearance image in the surrounding area image.

BRIEF DESCRIPTION OF THE DRAWING(S)

DETAILED DESCRIPTION OF THE INVENTION

In the following, a traffic safety assistance system 1 according to an embodiment of the present invention will be described with reference to the drawings.

<The Traffic Safety Assistance System 1>

Figure 1:
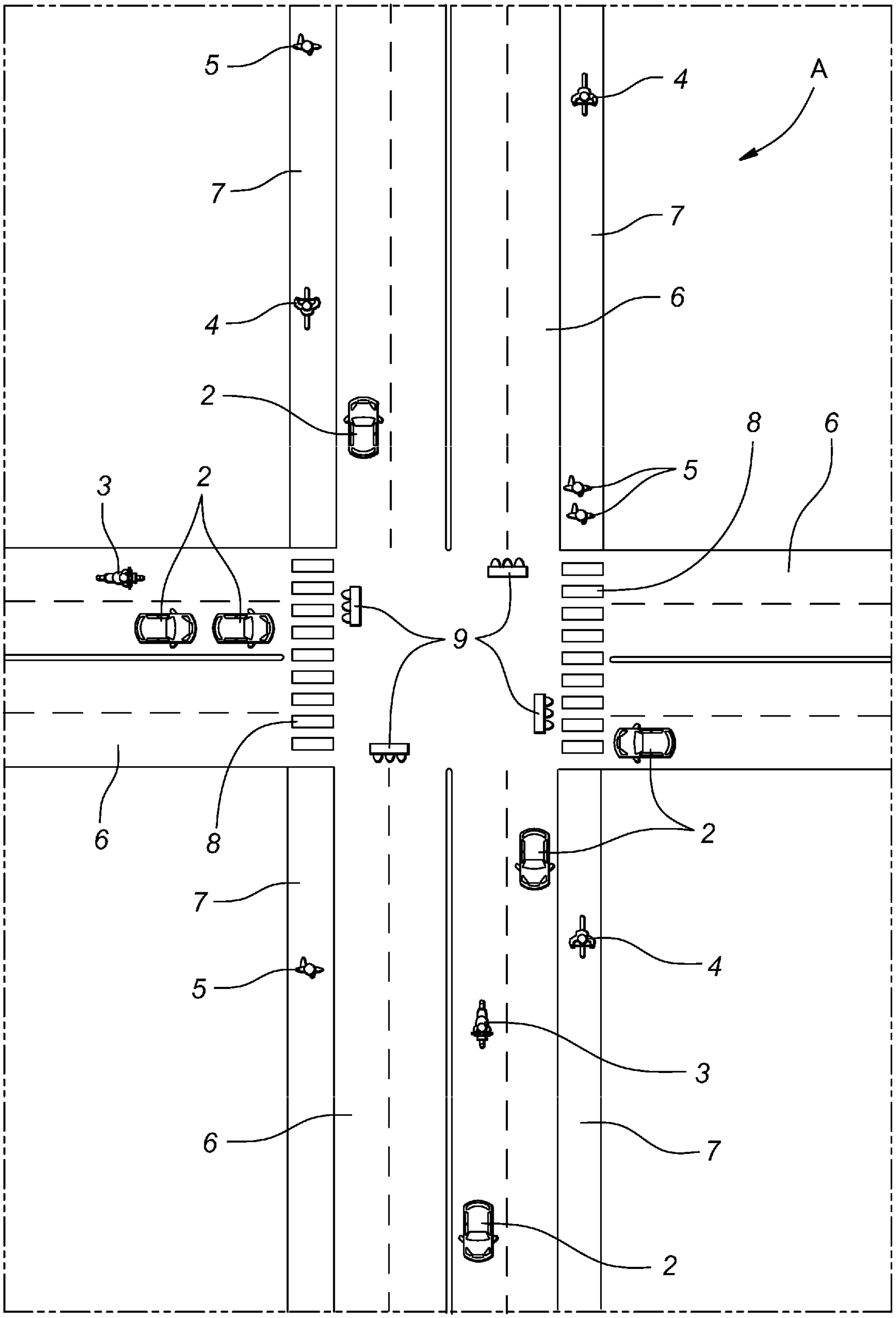
FIG. 1 is a schematic plan view showing a target traffic area according to an embodiment of the present invention.

FIG. 1 is a schematic plan view showing an example of a traffic area (hereinafter referred to as "the target traffic area A") to which the traffic safety assistance system 1 according to the embodiment of the present invention is applied. In the target traffic area A, a plurality of automobiles 2 (for example, four-wheeled automobiles), a plurality of motorcycles 3, a plurality of bicycles 4, and a plurality of pedestrians 5 exist as a plurality of traffic participants. In the target traffic area A, a plurality of roadways 6, a plurality of sidewalks 7, a plurality of crosswalks 8, a plurality of traffic signals 9, and the like exist as a plurality of infrastructures. The plurality of sidewalks 7, the plurality of crosswalks 8, and the plurality of traffic signals 9 are omitted in the drawings other than FIG. 1.

Figure 2:
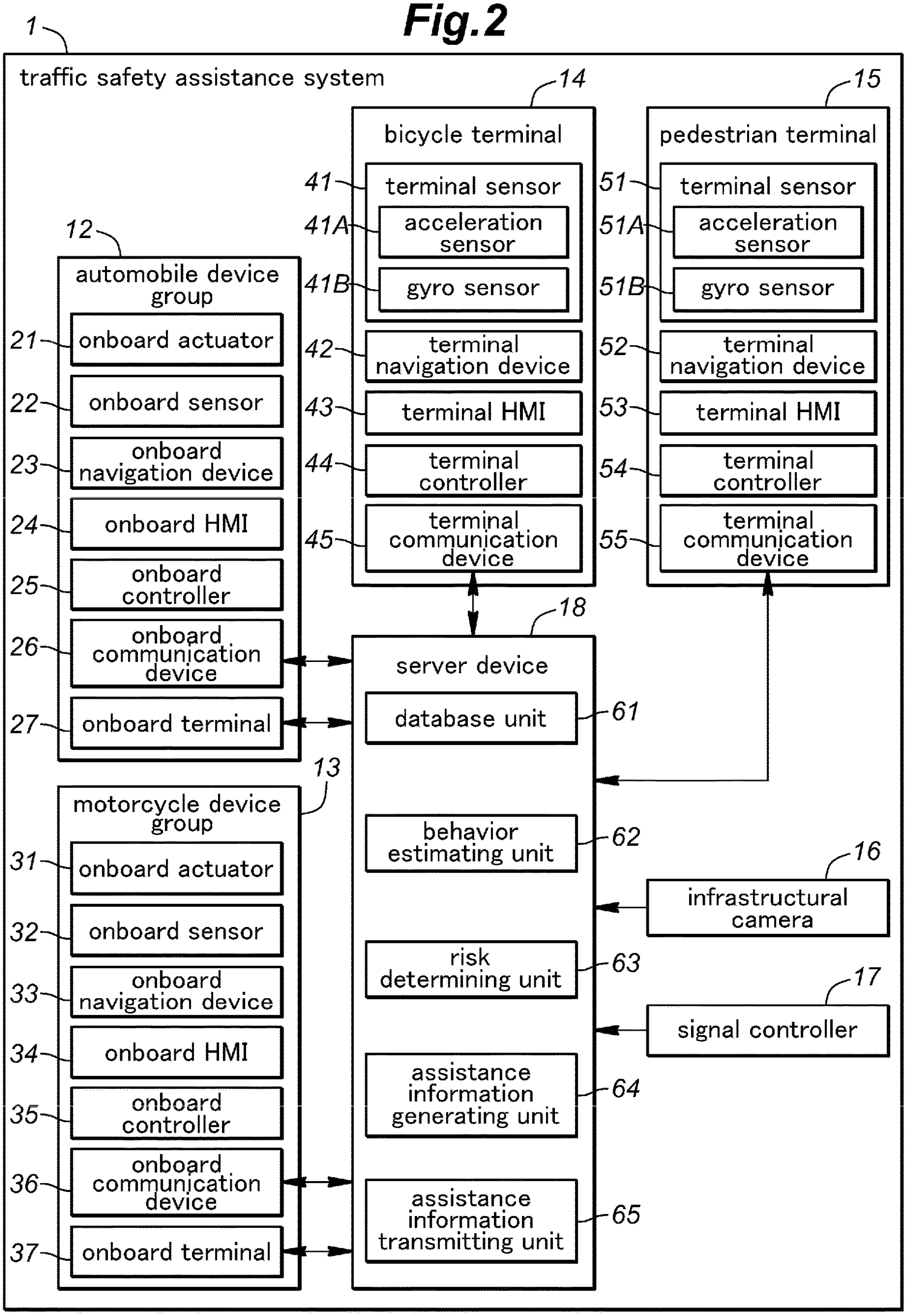
FIG. 2 is a functional block diagram showing a traffic safety assistance system according to the embodiment of the present invention.

With reference to FIG. 2, the traffic safety assistance system 1 includes a plurality of automobile device groups 12 (examples of acquiring devices and notifying devices), a plurality of motorcycle device groups 13 (examples of the acquiring devices and the notifying devices), a plurality of bicycle terminals 14 (examples of the acquiring devices and the notifying devices), a plurality of pedestrian terminals 15 (examples of the acquiring devices and the notifying devices), a plurality of infrastructural cameras 16, a signal controller 17, and a server device 18. In FIG. 2, only one of the plurality of automobile device groups 12, only one of the plurality of motorcycle device groups 13, only one of the plurality of bicycle terminals 14, only one of the plurality of pedestrian terminals 15, and only one of the plurality of infrastructural cameras 16 are displayed. In the following, the components of the traffic safety assistance system 1 will be described one by one.

<The Automobile Device Groups 12>

Each automobile device group 12 is provided in the corresponding automobile 2 and moves together with the corresponding automobile 2. Each automobile device group 12 includes an onboard actuator 21, an onboard sensor 22, an onboard navigation device 23, an onboard HMI 24, an onboard controller 25, an onboard communication device 26, and an onboard terminal 27. The components other than the onboard terminal 27 in each automobile device group 12 constitute a portion of the corresponding automobile 2.

The onboard actuator 21 includes a driving device that applies a driving force to the automobile 2, a brake device that applies a braking force to the automobile 2, and a steering device that steers wheels of the automobile 2. The driving device consists of an internal combustion engine and/or an electric motor.

The onboard sensor 22 detects various conditions related to the automobile 2. The onboard sensor 22 includes an external environment sensor that detects the state of an external environment of the automobile 2, a vehicle sensor that detects the state of the automobile 2, and a driver sensor that detects the state of a driver of the automobile 2. The external environment sensor includes an external environment camera that captures an image of an object (a delimiting line, an obstacle, another vehicle, and the like) existing around the automobile 2, a radar that detects a position of the object existing around the automobile 2 using radio waves such as millimeter waves, and a lidar (LiDAR) that detects the position of the object existing around the automobile 2 using light such as infrared rays. The vehicle sensor includes a vehicle speed sensor that detects a vehicle speed of the automobile 2. The driver sensor includes a driver camera that captures an image of the driver and a biological sensor that detects biological information (pulse, breathing, skin potential, and the like) about the driver.

The onboard navigation device 23 is a device that provides route guidance to the destination of the automobile 2, and the like. The onboard navigation device 23 stores map information. The onboard navigation device 23 identifies the current position of the automobile 2 based on GNSS signals received from artificial satellites.

The onboard HMI 24 gives notifications to the driver of the automobile 2. For example, the onboard HMI 24 includes a touch panel and a sound output device. The touch panel displays various screens to the driver. The sound output device outputs audio guidance, warning sounds, and the like to the driver.

The onboard controller 25 is an electronic control unit (ECU) consisting of one or more computers configured to execute various processes. The onboard controller 25 includes an arithmetic processing unit (a processor such as CPU and MPU) and a storage device (memory such as ROM and RAM). The onboard controller 25 is connected to each component of the automobile 2 and controls each component of the automobile 2. The onboard controller 25 controls the traveling of the automobile 2 by controlling the onboard actuator 21. The onboard controller 25 recognizes the object existing around the automobile 2 based on the detection result of the external environment sensor of the onboard sensor 22.

The onboard communication device 26 is connected to the server device 18 via a wireless communication network. The onboard communication device 26 transmits to the server device 18 various states related to the automobile 2 detected by the onboard sensor 22 and the current position of the automobile 2 identified by the onboard navigation device 23. The onboard communication device 26 receives traffic safety assistance information (details thereof will be described later) from the server device 18.

The onboard terminal 27 is a portable terminal carried by the driver of the automobile 2. The onboard terminal 27 is an electronic control unit (ECU) consisting of one or more computers configured to execute various processes. The onboard terminal 27 includes an arithmetic processing unit (a processor such as CPU and MPU) and a storage device (memory such as ROM and RAM). For example, the onboard terminal 27 consists of a wearable device or a smartphone. The onboard terminal 27 is connected to the server device 18 via the wireless communication network.

<The Motorcycle Device Groups 13>

Each motorcycle device group 13 is provided in the corresponding motorcycle 3 and moves together with the corresponding motorcycle 3. With reference to FIG. 2, each motorcycle device group 13 includes an onboard actuator 31, an onboard sensor 32, an onboard navigation device 33, an onboard HMI 34, an onboard controller 35, an onboard communication device 36, and an onboard terminal 37. The components other than the onboard terminal 37 in each motorcycle device group 13 constitute a portion of the corresponding motorcycle 3. The components of each motorcycle device group 13 are the same as the components of each automobile device group 12, so the description thereof will be omitted.

<The Bicycle Terminals 14>

Each bicycle terminal 14 is a portable terminal carried by the driver of the corresponding bicycle 4 and moves together with the corresponding bicycle 4. For example, each bicycle terminal 14 consists of a wearable device or a smartphone.

Each bicycle terminal 14 includes a terminal sensor 41, a terminal navigation device 42, a terminal HMI 43, a terminal controller 44, and a terminal communication device 45.

The terminal sensor 41 is installed in each bicycle terminal 14 and detects the state of the bicycle 4. The terminal sensor 41 includes an acceleration sensor 41A that detects acceleration of the bicycle 4 and a gyro sensor 41B that detects an angular velocity of the bicycle 4.

The terminal navigation device 42 stores map information. The terminal navigation device 42 identifies the current position of the bicycle 4 based on GNSS signals received from artificial satellites.

The terminal HMI 43 gives notifications to the driver of the bicycle 4. For example, the terminal HMI 43 includes a touch panel and a sound output device. The touch panel displays various screens to the driver. The sound output device outputs audio guidance, warning sounds, and the like to the driver.

The terminal controller 44 is an electronic control unit (ECU) consisting of one or more computers configured to execute various processes. The terminal controller 44 includes an arithmetic processing unit (a processor such as CPU and MPU) and a storage device (memory such as ROM and RAM).

The terminal communication device 45 is connected to the server device 18 via the wireless communication network. The terminal communication device 45 transmits to the server device 18 the state of the bicycle 4 detected by the terminal sensor 41 and the current position of the bicycle 4 identified by the terminal navigation device 42. The terminal communication device 45 receives the traffic safety assistance information (details thereof will be described later) from the server device 18.

<The Pedestrian Terminals 15>

Each pedestrian terminal 15 is a portable terminal carried by the corresponding pedestrian 5 and moves together with the corresponding pedestrian 5. For example, each pedestrian terminal 15 consists of a wearable device or a smartphone.

Each pedestrian terminal 15 includes a terminal sensor 51, a terminal navigation device 52, a terminal HMI 53, a terminal controller 54, and a terminal communication device 55. The terminal sensor 51 includes an acceleration sensor 51A that detects acceleration of the pedestrian 5 and a gyro sensor 51B that detects an angular velocity of the pedestrian 5. The components of each pedestrian terminal 15 are the same as the components of each bicycle terminal 14, so the description thereof will be omitted.

<The Infrastructural Cameras 16>

Each infrastructural camera 16 is provided in the target traffic area A. Each infrastructural camera 16 captures images of the plurality of traffic participants and the plurality of infrastructures in the target traffic area A. Each infrastructural camera 16 is connected to the server device 18 via the wireless communication network. Each infrastructural camera 16 transmits the captured images of the traffic participants and the infrastructures to the server device 18.

<The Signal Controller 17>

The signal controller 17 controls each traffic signal 9 installed in the target traffic area A. The signal controller 17 acquires information about each traffic signal 9 installed in the target traffic area A. The signal controller 17 is connected to the server device 18 via the wireless communication network. The signal controller 17 transmits the acquired information about each traffic signal 9 to the server device 18.

<The Server Device 18>

The server device 18 is an electronic control unit (ECU) consisting of one or more computers configured to execute various processes. The server device 18 includes an arithmetic processing unit (a processor such as CPU and MPU) and a storage device (memory such as ROM and RAM). The server device 18 consists of a virtual server provided in the cloud. In another embodiment, the server device 18 may consist of a physical server installed in a company operating the traffic safety assistance system 1 and the like.

The server device 18 includes a database unit 61, a behavior estimating unit 62, a risk determining unit 63, an assistance information generating unit 64, and an assistance information transmitting unit 65.

The database unit 61 stores map information (hereinafter referred to as "the area map information") about the target traffic area A. The area map information includes information about each roadway 6 (for example, information about the width and number of lanes in each roadway 6) in the target traffic area A, information about each sidewalk 7 (for example, information about the width of each sidewalk 7) in the target traffic area A, and information about each crosswalk 8 (for example, information about the position of each crosswalk 8) in the target traffic area A.

The behavior estimating unit 62 recognizes the state of the target traffic area A (that includes the state of the traffic participants existing in the target traffic area A) based on the information transmitted from the onboard communication device 26 of each automobile device group 12, the onboard communication device 36 of each motorcycle device group 13, the terminal communication device 45 of each bicycle terminal 14, the terminal communication device 55 of each pedestrian terminal 15, each infrastructural camera 16, and the signal controller 17, and the area map information stored in the database unit 61. The behavior estimating unit 62 estimates the prospective behavior (for example, the prospective trajectory) of the plurality of traffic participants based on the state of the target traffic area A. More specifically, the behavior estimating unit 62 constructs a virtual space corresponding to the target traffic area A based on the state of the target traffic area A, and estimates the prospective behavior of the plurality of traffic participants by performing simulation in the virtual space.

The risk determining unit 63 determines whether a risk (for example, a possibility of contact) is posed between the plurality of traffic participants based on the prospective behavior of the plurality of traffic participants estimated by the behavior estimating unit 62. For example, when the prospective trajectory of one of the traffic participants overlaps with the prospective trajectory of another of the traffic participants, the risk determining unit 63 determines that the risk is posed between these two traffic participants.

The assistance information generating unit 64 generates the traffic safety assistance information (hereinafter abbreviated as "the assistance information") based on the determination result of the risk determining unit 63. The assistance information is information to notify the presence of the risk to the traffic participants to be the parties (hereinafter referred to as "the risk parties") involved in the risk. The assistance information includes information about the risk parties (for example, information about locations of the risk parties) and information about the contents of the risk (for example, information about the location where the risk is posed).

The assistance information transmitting unit 65 transmits the assistance information generated by the assistance information generating unit 64 to the risk parties. For example, in a case where one automobile 2 in the target traffic area A is included in the risk parties, the assistance information transmitting unit 65 transmits the assistance information to the onboard communication device 26 provided in the one automobile 2. Accordingly, the onboard HMI 24 provided in the one automobile 2 notifies the assistance information to the driver of the one automobile 2.

<The Operation of the Traffic Safety Assistance System 1>

As described above, each automobile device group 12 (more specifically, the onboard sensor 22 and the onboard navigation device 23), each motorcycle device group 13 (more specifically, the onboard sensor 32 and the onboard navigation device 33), each bicycle terminal 14 (more specifically, the terminal sensor 41 and the terminal navigation device 42), and each pedestrian terminal 15 (more specifically, the terminal sensor 51 and the terminal navigation device 52) acquire the information about the plurality of traffic participants existing in the target traffic area A. The server device 18 estimates the prospective behavior of the plurality of traffic participants based on the information about the plurality of traffic participants acquired by these devices. Each automobile device group 12 (more specifically, the onboard HMI 24), each motorcycle device group 13 (more specifically, the onboard HMI 34), each bicycle terminal 14 (more specifically, the terminal HMI 43), and each pedestrian terminal 15 (more specifically, the terminal HMI 53) give notifications to the plurality of traffic participants based on the estimation result of the server device 18. Thus, the traffic safety assistance system 1 assists the plurality of traffic participants in safe traffic.

In a case where the traffic participant is a vehicle (for example, the automobile 2, the motorcycle 3, or the bicycle 4), a notification to the traffic participant means a notification to an occupant (for example, a driver) of the traffic participant. On the other hand, in a case where the traffic participant is a human being (for example, the pedestrian 5), a notification to the traffic participant means a notification to the traffic participant himself/herself.

<The Traffic Participants>

Figure 3:
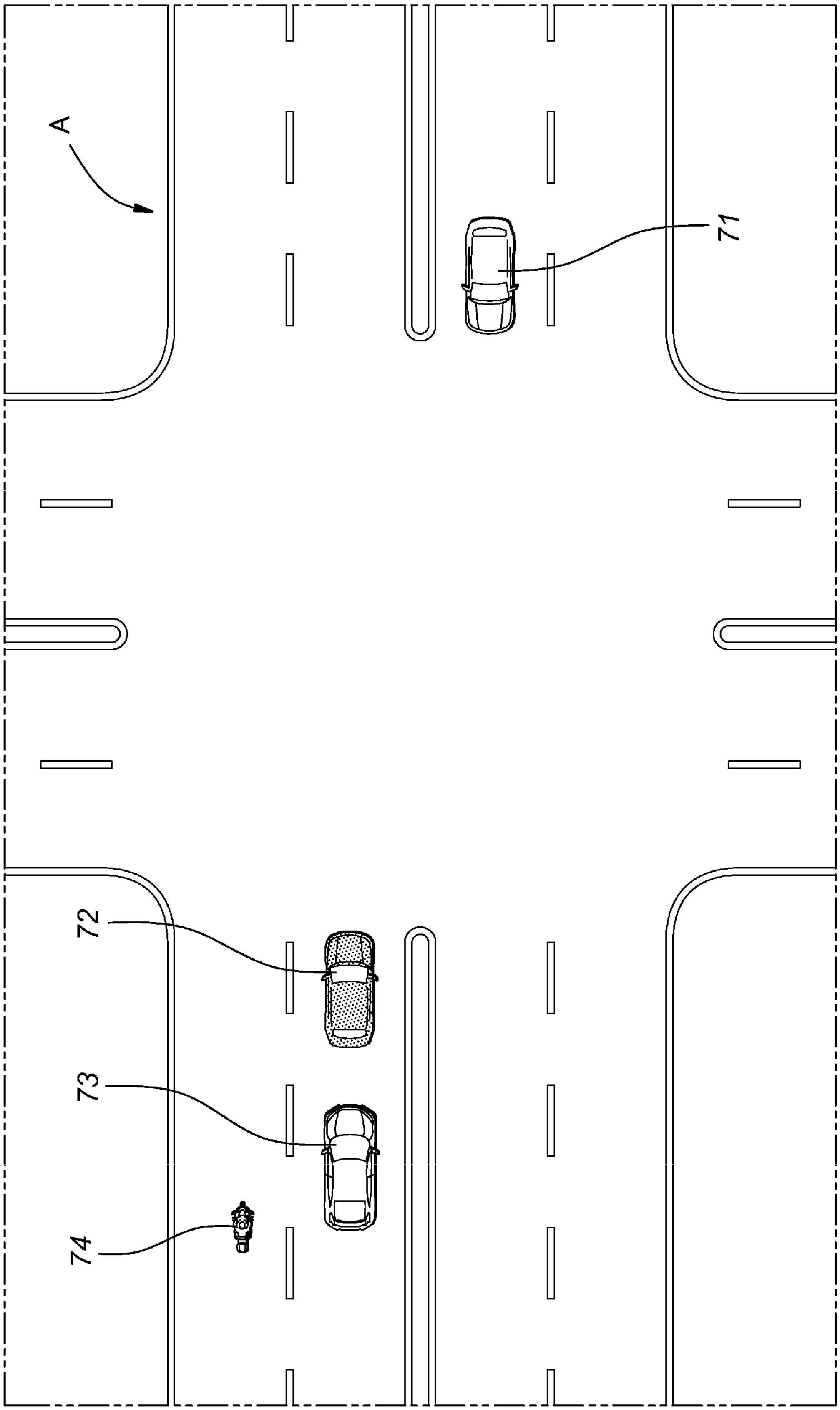
FIG. 3 is a plan view showing a main portion of the target traffic area according to the embodiment of the present invention.

With reference to FIG. 3, the plurality of automobiles 2 existing in the target traffic area A includes a first automobile 71, a second automobile 72, and a third automobile 73. The plurality of motorcycles 3 existing in the target traffic area A includes a motorcycle 74. The first automobile 71 is an example of a first traffic participant and a first vehicle. The second automobile 72, the third automobile 73, and the motorcycle 74 are examples of second traffic participants and second vehicles. Hereinafter, the second automobile 72, the third automobile 73, and the motorcycle 74 will be collectively referred to as "the surrounding vehicle(s) 72 to 74".

<The Configuration of the First Automobile 71>

Figure 4:
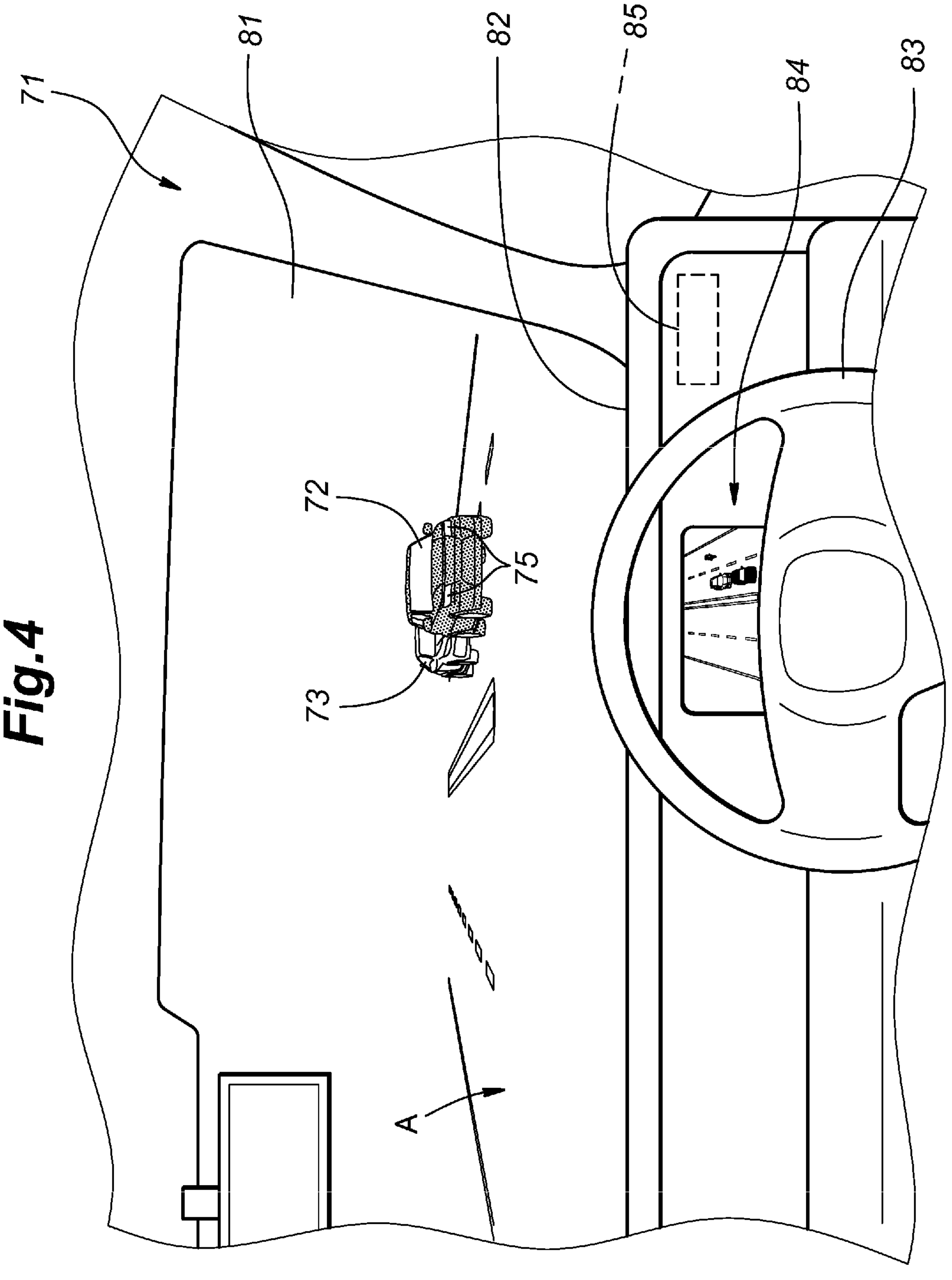
FIG. 4 is an explanatory diagram showing a situation where a visual error may occur in the embodiment of the present invention.

With reference to FIG. 4, the first automobile 71 is provided with a dashboard 82 below a front window (wind shield) 81. A meter panel 84 (an example of a display device) is provided in the dashboard 82 in front of a steering wheel 83. The meter panel 84 is a device that displays a vehicle speed of the first automobile 71, and the like. The meter panel 84 is one of the components of the onboard HMI 24 of the first automobile 71.

The first automobile 71 is provided with a speaker 85 (an example of a sound output device) at any location such as the dashboard 82 and a door (not shown). The speaker 85 is a device that outputs audio guidance, warning sounds, and the like to the driver of the first automobile 71. The speaker 85 is one of the components of the onboard HMI 24 of the first automobile 71.

<The Surrounding Area Image 91>

Figure 5:
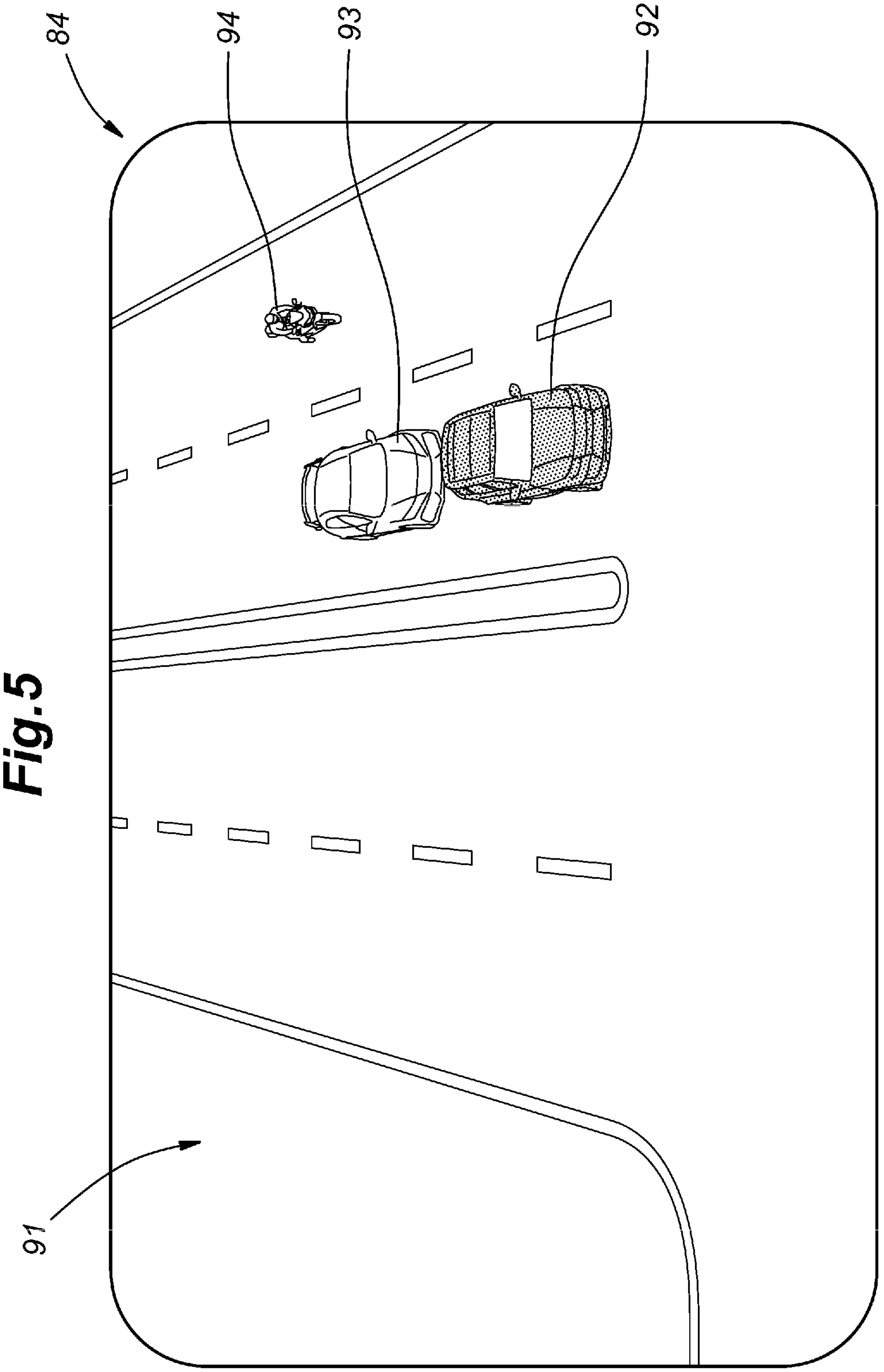
FIG. 5 is an explanatory diagram showing a surrounding area image in the situation of FIG. 4.

With reference to FIG. 5, the meter panel 84 is configured to display a surrounding area image 91. The surrounding area image 91 is an image showing a surrounding area of the first automobile 71. The surrounding area image 91 may be generated by the onboard controller 25 of the first automobile 71. Alternatively, the surrounding area image 91 may be generated by the server device 18 and transmitted from the server device 18 to the first automobile 71.

The surrounding area image 91 is a bird's-eye image (three-dimensional image) looking down on the surrounding area of the first automobile 71 from a point above the first automobile 71 toward a front and lower side thereof. In another embodiment, the surrounding area image 91 may be a look-down image (two-dimensional image) looking down on the first automobile 71 and its surrounding area from right above.

First to third appearance images 92 to 94 are displayed at positions corresponding to the surrounding vehicles 72 to 74 in the surrounding area image 91. The first appearance image 92 is an appearance image of the second automobile 72, the second appearance image 93 is an appearance image of the third automobile 73, and the third appearance image 94 is an appearance image of the motorcycle 74. Hereinafter, the first to third appearance image(s) 92 to 94 will be collectively referred to as "the appearance image(s) 92 to 94". The meter panel 84 may determine the positions of the appearance images 92 to 94 in the surrounding area image 91 based on the position information about the surrounding vehicles 72 to 74 transmitted from the surrounding vehicles 72 to 74 to the first automobile 71 via the server device 18.

The appearance images 92 to 94 of the surrounding vehicles 72 to 74 are stored in the database unit 61 (an example of the storage unit) of the server device 18 and transmitted from the server device 18 to the first automobile 71 together with the position information about the surrounding vehicles 72 to 74. In a case where the appearance images 92 to 94 of at least one of the surrounding vehicles 72 to 74 cannot be transmitted from the server device 18 to the first automobile 71, the meter panel 84 may display a prescribed symbolic image at a position corresponding to the at least one of the surrounding vehicles 72 to 74 in the surrounding area image 91.

The appearance images 92 to 94 of the surrounding vehicles 72 to 74 are three-dimensional images corresponding to the vehicle models and colors of the surrounding vehicles 72 to 74 (an example of appearance of the surrounding vehicles 72 to 74). Accordingly, the shapes and colors of the appearance images 92 to 94 of the surrounding vehicles 72 to 74 vary from one surrounding vehicle 72 to 74 to another. In another embodiment, in a case where the surrounding area image 91 is a look-down image (two-dimensional image), the appearance images 92 to 94 of the surrounding vehicles 72 to 74 may be two-dimensional images.

In a case where a blinker 75 (see FIG. 4) of one of the surrounding vehicles 72 to 74 is operating, the meter panel 84 may blink a portion (for example, a portion corresponding to the blinker 75 of the one of the surrounding vehicles 72 to 74) of the appearance image 92 to 94 of the one of the surrounding vehicles 72 to 74, or may blink the entire appearance image 92 to 94 of the one of the surrounding vehicles 72 to 74. The information about the operation of the blinker 75 of the one of the surrounding vehicles 72 to 74 may be transmitted from the one of the surrounding vehicles 72 to 74 to the first automobile 71 via the server device 18.

<The Output of the Simulated Sounds of the Surrounding Vehicles 72 to 74>

While the meter panel 84 is displaying the appearance images 92 to 94 of the surrounding vehicles 72 to 74, the speaker 85 outputs simulated sounds of the surrounding vehicles 72 to 74. The simulated sounds of the surrounding vehicles 72 to 74 correspond to sound data on the surrounding vehicles 72 to 74 (data on sounds generated by the surrounding vehicles 72 to 74) transmitted from the server device 18 to the first automobile 71. For example, the simulated sounds of the surrounding vehicles 72 to 74 are sounds that reproduce the output sounds of the driving devices (internal combustion engines and/or electric motors) of the surrounding vehicles 72 to 74. The sound levels and sizes of the simulated sounds of the surrounding vehicles 72 to 74 vary from one surrounding vehicle 72 to 74 to another.

<The Image Transmission Control>

Figure 6:
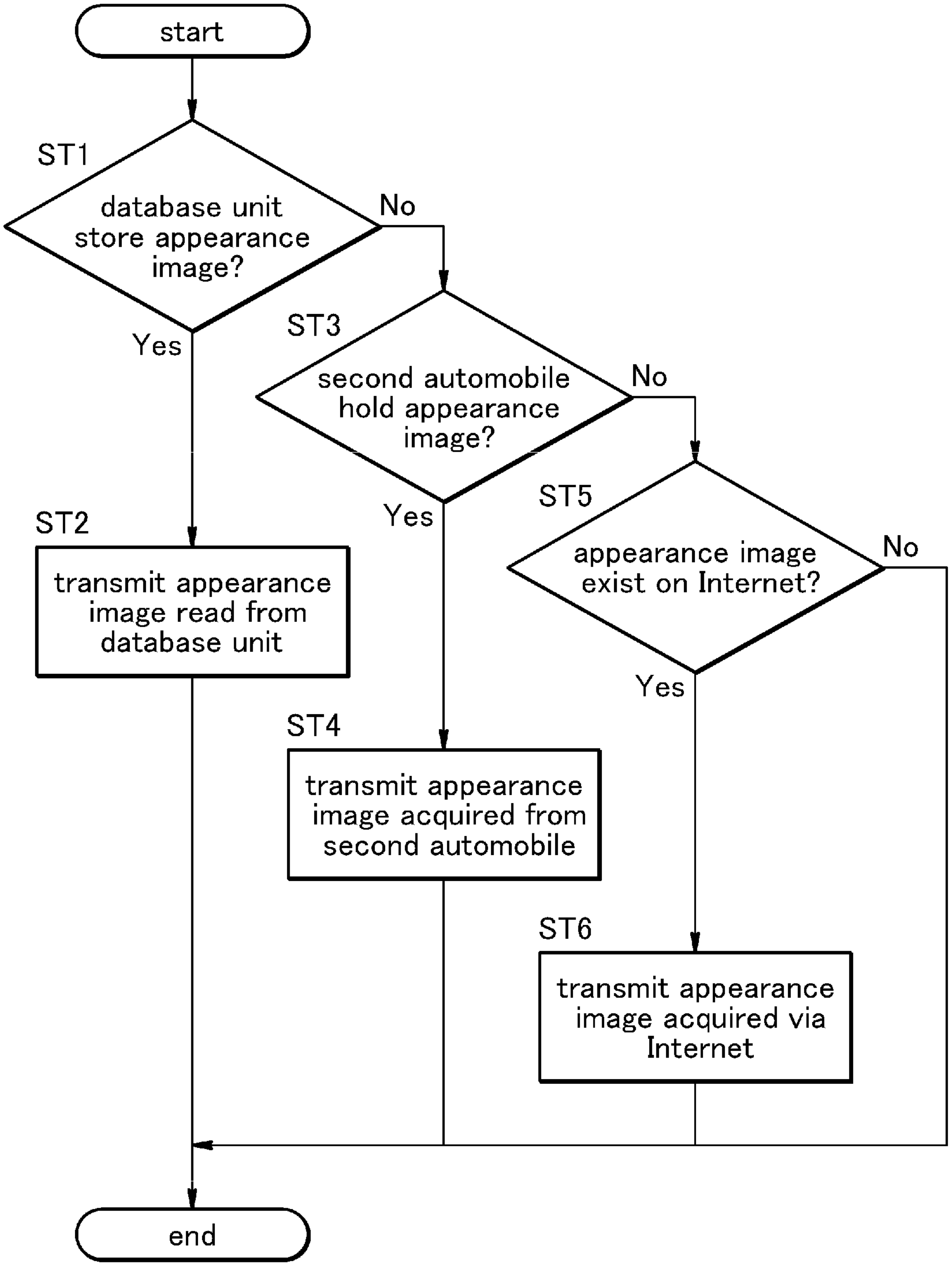
FIG. 6 is a flowchart showing image transmission control according to the embodiment of the present invention.

Next, image transmission control executed by the server device 18 will be described with reference to FIG. 6. In the present embodiment, as an example, the image transmission control in a case where the server device 18 transmits the appearance image (i.e., the first appearance image 92) of the second automobile 72 to the first automobile 71 will be described.

When the image transmission control is started, the server device 18 determines whether the database unit 61 stores the appearance image of the second automobile 72 (step ST1).

In a case where the database unit 61 stores the appearance image of the second automobile 72 (step ST1: Yes), the server device 18 transmits the appearance image of the second automobile 72 read from the database unit 61 to the first automobile 71 (step ST2).

In a case where the database unit 61 does not store the appearance image of the second automobile 72 (step ST1: No), the server device 18 determines whether the second automobile 72 holds the appearance image of the second automobile 72 (i.e., the appearance image of the own vehicle) (step ST3).

In a case where the second automobile 72 holds the appearance image of the second automobile 72 (step ST3: Yes), the server device 18 acquires the appearance image of the second automobile 72 from the second automobile 72, and transmits the appearance image of the second automobile 72 acquired from the second automobile 72 to the first automobile 71 (step ST4).

In a case where the second automobile 72 does not hold the appearance image of the second automobile 72 (step ST3: No), the server device 18 determines whether the appearance image of the second automobile 72 exists on the Internet (an example of the outside network) (step ST5).

In a case where the appearance image of the second automobile 72 exists on the Internet (step ST5: Yes), the server device 18 acquires the appearance image of the second automobile 72 via the Internet, and transmits the appearance image of the second automobile 72 acquired via the Internet to the first automobile 71 (step ST6).

In a case where the appearance image of the second automobile 72 does not exist on the Internet (step ST5: No), the server device 18 ends the image transmission control without transmitting the appearance image of the second automobile 72 to the first automobile 71.

The Effects

As shown in FIG. 5, at positions corresponding to the surrounding vehicles 72 to 74 in the surrounding area image 91, symbolic images common to all the surrounding vehicles 72 to 74 are not displayed, but the appearance images 92 to 94 whose shapes and colors vary from one surrounding vehicle 72 to 74 to another are displayed. Accordingly, the driver of the first automobile 71 can easily determine the correspondence and relationship between the surrounding vehicles 72 to 74 in the actual space and the appearance images 92 to 94 in the surrounding area image 91.

In a situation shown in FIG. 4, when viewed from the first automobile 71, the motorcycle 74 is hidden behind the second and third automobiles 72 and 73. Accordingly, the onboard sensor 22 of the first automobile 71 cannot detect the position of the motorcycle 74. However, the first automobile 71 and the motorcycle 74 are connected to the server device 18 via the wireless communication network. Accordingly, the position information about the motorcycle 74 can be transmitted from the motorcycle 74 to the first automobile 71 via the server device 18 by wireless communication. Accordingly, the meter panel 84 of the first automobile 71 can display the third appearance image 94 (the appearance image of the motorcycle 74) at a position corresponding to the motorcycle 74 in the surrounding area image 91 based on the position information about the motorcycle 74 transmitted from the motorcycle 74 to the first automobile 71 via the server device 18.

In a situation shown in FIG. 4, when viewed from the driver of the first automobile 71, the motorcycle 74 is hidden behind the second and third automobiles 72 and 73. Accordingly, the driver of the first automobile 71 cannot visually recognize the motorcycle 74. That is, in the situation shown in FIG. 4, a visual error of the motorcycle 74 may occur. However, as shown in FIG. 5, the third appearance image 94 (the appearance image of the motorcycle 74) is displayed in the surrounding area image 91, which is a bird's-eye image. Accordingly, the driver of the first automobile 71 can check the position of the motorcycle 74 by the third appearance image 94 displayed in the surrounding area image 91.

Figure 7:
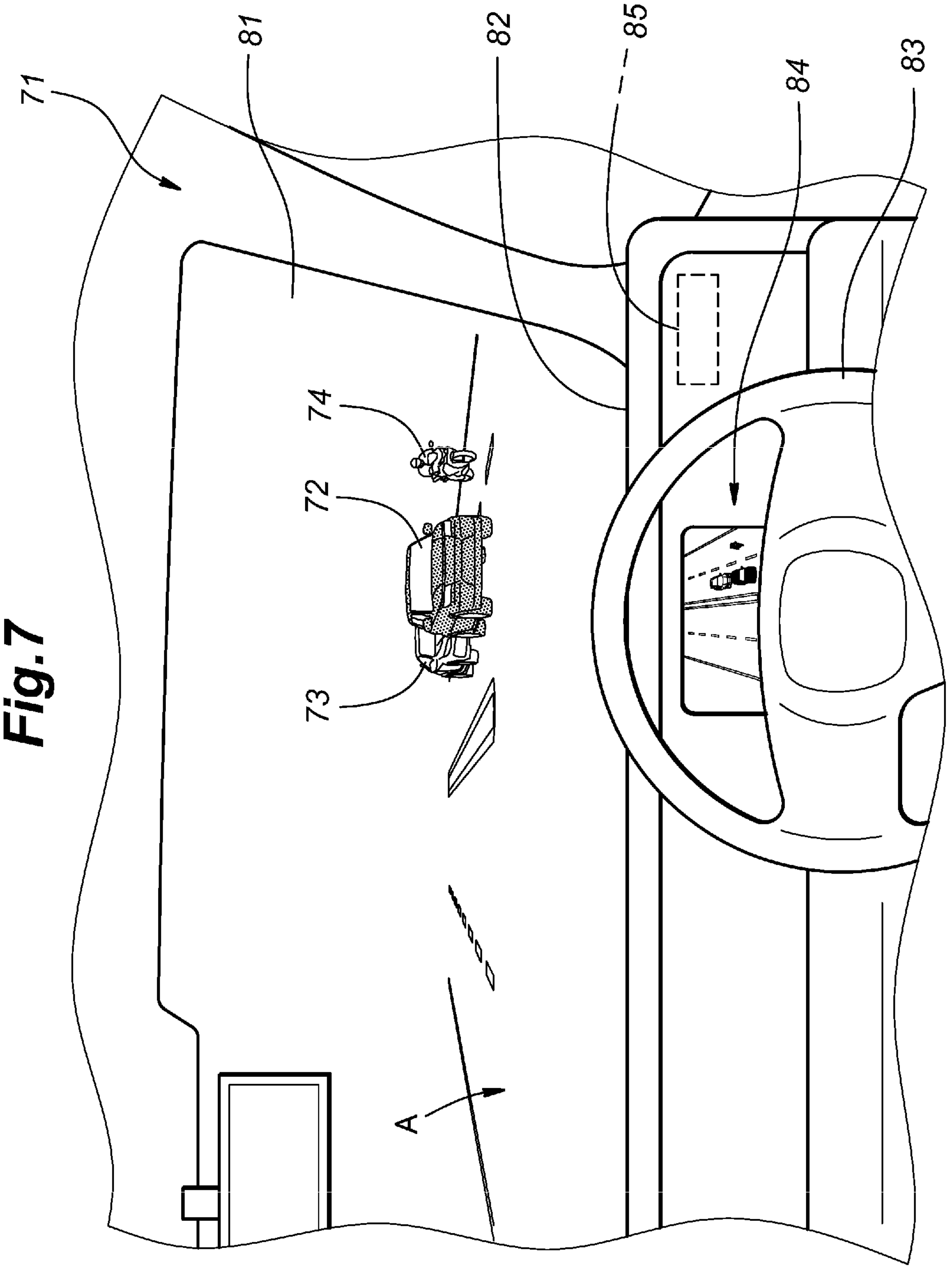
FIG. 7 is an explanatory diagram showing a situation where an estimation error may occur in the embodiment of the present invention.
Figure 8:
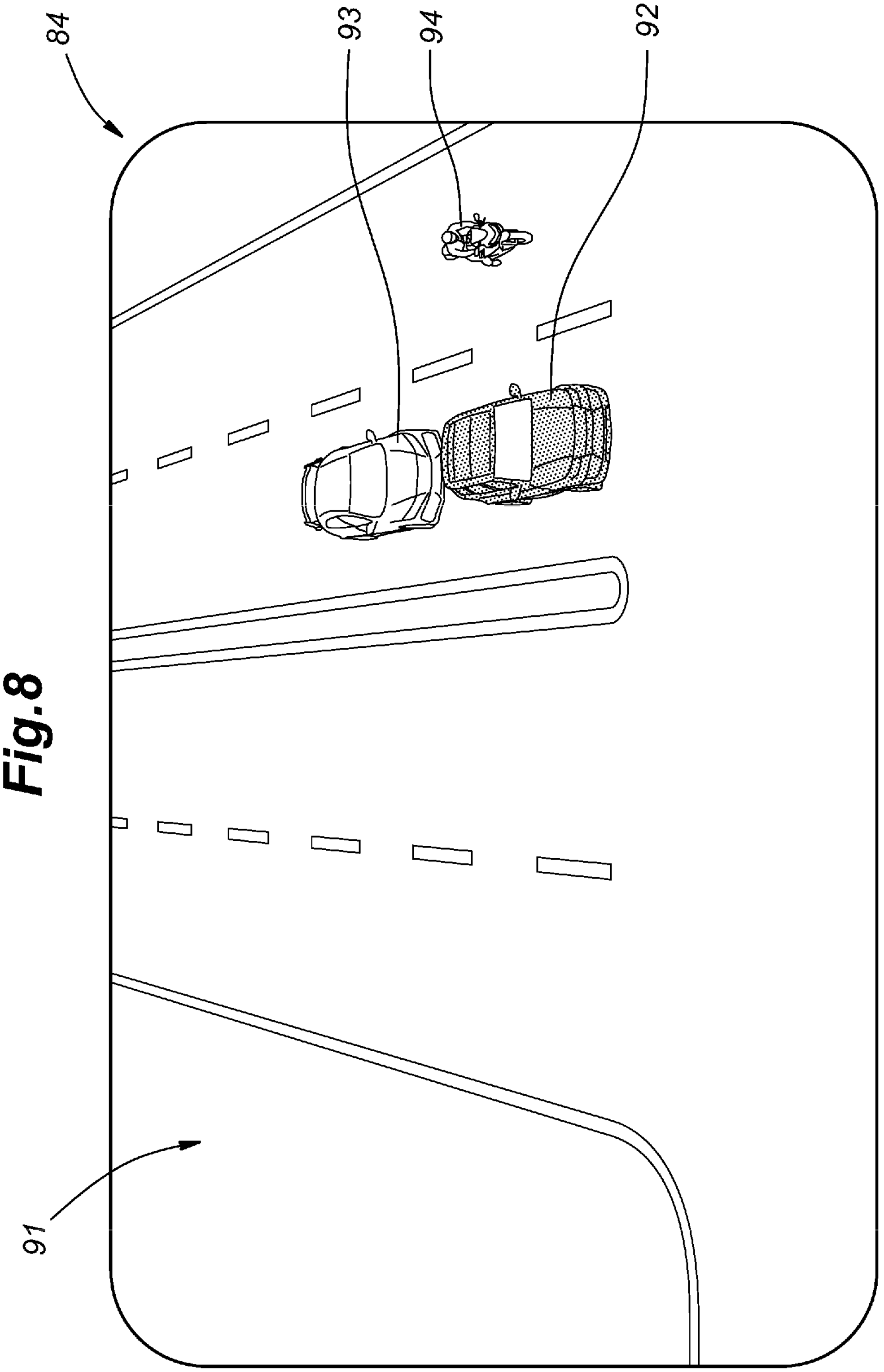
FIG. 8 is an explanatory diagram showing the surrounding area image in the situation of FIG. 7.

In a situation shown in FIG. 7, the motorcycle 74 is arranged next to the second automobile 72, which is larger than the motorcycle 74. As such, the driver of the first automobile 71 may estimate that the motorcycle 74 is farther away than it actually is. That is, in the situation shown in FIG. 7, an estimation error of the motorcycle 74 may occur. However, as shown in FIG. 8, the surrounding area image 91, which is a bird's-eye image, clearly displays the positional relationship between the second automobile 72 and the motorcycle 74. Accordingly, the driver of the first automobile 71 can accurately grasp the actual position of the motorcycle 74 by the surrounding area image 91.

The Modified Embodiment

Figure 9:
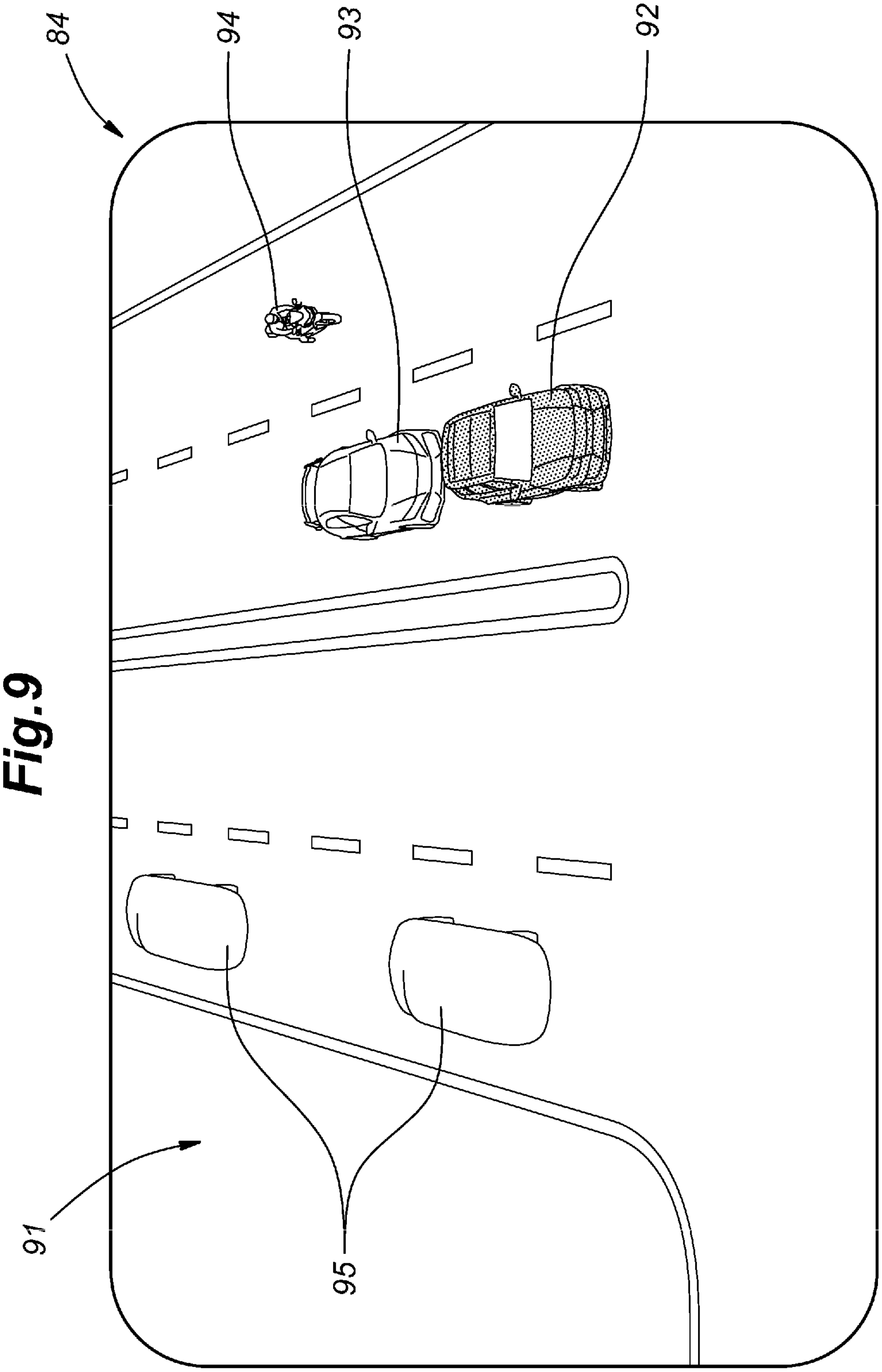
FIG. 9 is an explanatory diagram showing a surrounding area image according to a modified embodiment of the present invention.

In the above embodiment, as shown in FIG. 5, only the appearance images 92 to 94 that vary from one surrounding vehicle 72 to 74 to another are used in the surrounding area image 91. In another embodiment, as shown in FIG. 9, not only the appearance images 92 to 94 that vary from one surrounding vehicle 72 to 74 to another but also prescribed symbolic images 95 may be used in the surrounding area image 91. For example, at positions corresponding to the surrounding vehicles 72 to 74 that are included in the risk parties in the assistance information transmitted from the server device 18 to the first automobile 71, the appearance images 92 to 94 that vary from one surrounding vehicle 72 to 74 to another may be displayed. On the other hand, at positions corresponding to the surrounding vehicles (non-risk parties: not shown) that are not included in the risk parties in the abovementioned assistance information, the prescribed symbolic images 95 may be displayed.

In the above embodiment, as shown in FIG. 5, the appearance images 92 to 94 corresponding to all the traffic participants are displayed in the surrounding area image 91. In another embodiment, only the appearance images 92 to 94 corresponding to the specific traffic participants, which are included in the risk parties in the assistance information transmitted from the server device 18 to the first automobile 71, may be displayed in the surrounding area image 91. That is, the display of the appearance images 92 to 94 in the surrounding area image 91 may be prohibited with respect to the traffic participants (non-risk parties) that are not included in the risk parties in the abovementioned assistance information.

In the above embodiment, the automobile 2 (the first automobile 71) is an example of the first traffic participant. In another embodiment, the traffic participant (for example, the motorcycle 3, the bicycle 4, or the pedestrian 5) other than the automobile 2 may be an example of the first traffic participant.

In the above embodiment, the automobiles 2 (the second and third automobiles 72, 73) and the motorcycle 3 (the motorcycle 74) are examples of the second traffic participants. In another embodiment, the traffic participants (for example, the bicycle 4 or the pedestrian 5) other than the automobiles 2 and the motorcycle 3 may be examples of the second traffic participant. In a case where the bicycle 4 or the pedestrian 5 is an example of the second traffic participant, an image of the bicycle 4 or the pedestrian 5 captured by the camera of the bicycle terminal 14 or the pedestrian terminal 15 may be used as the appearance image of the second traffic participant.

In the above embodiment, the automobiles 2, the motorcycles 3, the bicycles 4, and the pedestrians 5 are examples of the traffic participants. In another embodiment, mobile objects (for example, two-wheeled self-balancing transporters, ships, aircrafts, and the like) other than the automobiles 2, the motorcycles 3, the bicycles 4, and the pedestrians 5 may be examples of the traffic participants.

Concrete embodiments of the present invention have been described in the foregoing, but the present invention should not be limited by the foregoing embodiments and various modifications and alterations are possible within the scope of the present invention.

The invention claimed is:

1. A traffic safety assistance system, comprising:

an acquiring device configured to acquire information about a plurality of traffic participants that exists in a target traffic area;

a server device configured to estimate prospective behavior of the plurality of traffic participants based on the information about the plurality of traffic participants acquired by the acquiring device; and a notifying device configured to give notifications to the plurality of traffic participants based on an estimation result of the server device, wherein the plurality of traffic participants includes at least one first traffic participant and at least one second traffic participant, the server device is configured to transmit an appearance image of the second traffic participant corresponding to appearance of the second traffic participant to the first traffic participant, the second traffic participant is configured to transmit position information about the second traffic participant to the first traffic participant via the server device by wireless communication, the notifying device includes a display device provided in the first traffic participant, and the display device is configured to display a surrounding area image showing a surrounding area of the first traffic participant, and display the appearance image of the second traffic participant, which is transmitted from the server device to the first traffic participant, at a position corresponding to the second traffic participant in the surrounding area image based on the position information about the second traffic participant transmitted from the second traffic participant to the first traffic participant via the server device.

2. The traffic safety assistance system according to claim 1, wherein the server device is configured to transmit sound data to the first traffic participant together with the appearance image of the second traffic participant, the sound data being data on a sound generated by the second traffic participant, the notifying device includes a sound output device provided in the first traffic participant, and the sound output device is configured to output a sound corresponding to the sound data while the display device is displaying the appearance image of the second traffic participant.

3. The traffic safety assistance system according to claim 1, wherein the display device is configured to display a prescribed symbolic image at the position corresponding to the second traffic participant in the surrounding area image in a case where the server device cannot transmit the appearance image of the second traffic participant to the first traffic participant.

4. The traffic safety assistance system according to claim 1, wherein the server device includes a storage unit configured to store appearance images of the plurality of traffic participants, and the server device is configured to transmit the appearance image of the second traffic participant read from the storage unit to the first traffic participant in a case where the storage unit stores the appearance image of the second traffic participant.

5. The traffic safety assistance system according to claim 4, wherein the server device is configured to transmit the appearance image of the second traffic participant acquired from the second traffic participant to the first traffic participant in a case where the storage unit does not store the appearance image of the second traffic participant but the second traffic participant holds the appearance image of the second traffic participant.

6. The traffic safety assistance system according to claim 5, wherein the server device is configured to transmit the appearance image of the second traffic participant acquired via an outside network to the first traffic participant in a case where the storage unit does not store the appearance image of the second traffic participant and the second traffic participant does not hold the appearance image of the second traffic participant.

7. The traffic safety assistance system according to claim 1, wherein the server device is configured to determine whether a risk is posed between the plurality of traffic participants, the at least one second traffic participant comprises a plurality of second traffic participants including:

a plurality of risk parties that is included in parties involved in the risk; and a non-risk party that is not included in the parties involved in the risk, and the display device is configured to display appearance images of the plurality of risk parties, which vary from one risk party to another, at positions corresponding to the plurality of risk parties, and display a prescribed symbolic image at a position corresponding to the non-risk party.

8. The traffic safety assistance system according to claim 1, wherein the first traffic participant is a first vehicle, the second traffic participant is a second vehicle, and the display device is configured to blink at least a portion of an appearance image of the second vehicle in a case where a blinker of the second vehicle is operating.

9. The traffic safety assistance system according to claim 1, wherein the first traffic participant is a first vehicle, the second traffic participant is a second vehicle, and the server device is configured to transmit a three-dimensional image of the second vehicle corresponding to a vehicle model and color of the second vehicle to the first vehicle.

* * * * *